United States Patent [19]

Komurasaki

[11] Patent Number: 4,961,338

[45] Date of Patent: Oct. 9, 1990

[54] VIBRATION DETECTING DEVICE

[75] Inventor: Satoshi Komurasaki, Hyogo, Japan

[73] Assignee: Mitsubishi Denki Kabushiki Kaisha, Tokyo, Japan

[21] Appl. No.: 312,148

[22] Filed: Feb. 21, 1989

[30] Foreign Application Priority Data

Feb. 26, 1988 [JP] Japan .................................. 63-23883

[51] Int. Cl.$^5$ .............................................. G01L 23/22
[52] U.S. Cl. ........................................ 73/35; 310/329
[58] Field of Search ..................... 73/35, 654; 310/329

[56] References Cited

U.S. PATENT DOCUMENTS

| 4,190,782 | 2/1980 | Guess | 310/324 |
| 4,468,950 | 9/1984 | Ishigami et al. | 73/35 |
| 4,475,508 | 10/1984 | Okada | 73/35 |
| 4,660,409 | 4/1987 | Miyata et al. | 73/35 |

FOREIGN PATENT DOCUMENTS

| 2917213 | 11/1979 | Fed. Rep. of Germany . |
| 3037835 | 8/1982 | Fed. Rep. of Germany . |
| 3139063 | 4/1983 | Fed. Rep. of Germany . |
| 3429217 | 2/1986 | Fed. Rep. of Germany . |
| 2491625 | 4/1982 | France . |

Primary Examiner—John Chapman
Attorney, Agent, or Firm—Sughrue, Mion, Zinn, Macpeak & Seas

[57] ABSTRACT

A vibration detecting device attached to, for example, an internal combustion engine with a boss having a mounting surface for mounting the device which has the purpose of detecting knocking of the engine from the vibration thereof. The device has a housing containing a piezoelectric element and a weight which is adapted to impose inertial force on the piezoelectric element in response to vibrations from the engine whereby signals representing the vibrations are derived from the piezoelectric element. The housing has a effective contact surface which is smaller in area than the mounting surface, and the whole of which is in face contact with the mounting surface when mounted. The device is so arranged that the signals from the piezoelectric element represent the vibrations from the engine exactly as the are.

2 Claims, 2 Drawing Sheets

Fig. 1    Fig. 2
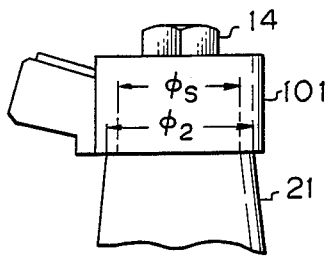 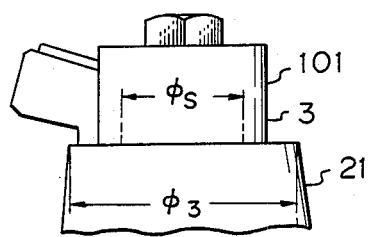
Fig. 3
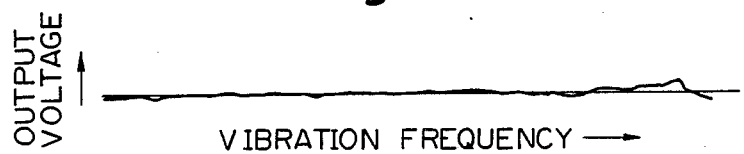
Fig. 6 (PRIOR ART)
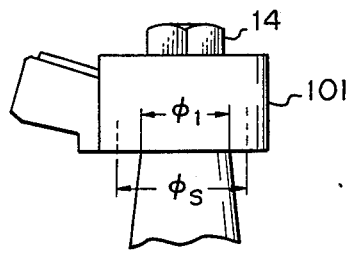
Fig. 7 (PRIOR ART)
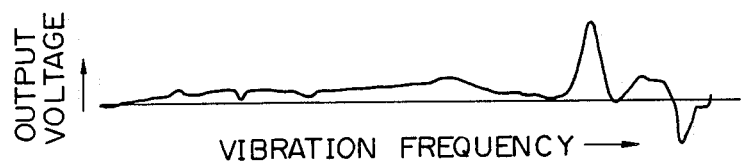

VIBRATION DETECTING DEVICE

TECHNICAL FIELD

This invention relates to a vibration detecting device attached to, for example, an internal combustion engine for the purpose of detecting the occurrence of knocking from vibration thereof and the like.

BACKGROUND ART

Reference is now made to FIG. 5 which shows a conventional vibration detecting device 101 of the type wherein a metal-made bush 1 has a bore 13 for a mounting bolt, and a surface which has an effective surface 1a with a diameter of the dimension $\phi_s$, the bush being adapted to rest on an internal combustion engine. Held in the space defined between the bush and a case 3 is a Vibration-Voltage converter 2 which consists of a weight 8 and a piezoelectric element 5 disposed on a plate 4 which, in turn, rests on a fundamental surface 1b. An output signal from the piezoelectric element 5 is led from a terminal 6 to an output pin 11. An insulating sheet 7 is located on the upper surface of the terminal 6. The converter 2 is secured by way of a nut 9 screwed onto the threaded portion 1c of the bush 1. The bush 1 and the case 3 collaborate in forming an outer housing with the space therein plugged with a filling 10 consisting of an epoxy resin. An insulating tube 12 is provided around the periphery of the cylindrical portion of the bush 1.

As shown in FIG. 6, the vibration detecting device 101 of the above described type is secured to a boss 21 of an internal combustion engine by way of a bolt 14 in such a manner that the effective contact surface 1a is in face contact with the mounting surface of the boss. Any vibrations showing up in response to the running conditions of an internal combustion engine are transmitted through the effective contact surface to the device and the inertial force of the weight 8 and the result is then imposed on the piezoelectric element 5. The resulting signals from the latter are processed in order to distinguish particular signals (knock signals) that appear upon the occurence of knocking, which is a known phenomenon indicating lack of smooth functioning of an internal combustion engine. Based on the result of this detection, the performance parameters of the internal combustion engine are so controlled as to ensure an optimum output from the engine with maximum fuel efficiency.

It is a basic requirement for efficient functioning of the above device that the vibration of an engine is detected exactly. In order to achieve such precise detection, the condition in which the device is mounted on an internal combustion engine has to be optimum relative to its vibration detection characteristic. However, since the conventional device of the above described type has, as viewed in FIG. 6, an effective contact surface which has a greater diameter $\phi_s$ than a diameter $\phi_1$ of the surface of the boss on which it is mounted (that is, $\phi_1 < \phi_s$), the vibration detection characteristic of the device exhibits fluctuation as viewed in FIG. 7 even though it originally has a flat frequency characteristic. The greater the diameter $\phi_s$ is relative to the diameter $\phi_1$, the more conspicuous is and the greater is the magnitude of the fluctuation of the vibration detection characteristic, especially in a low frequency region. In that situation, the result of the detection conducted by the device no longer truly represents the vibration of the engine in its actual state.

DISCLOSURE OF THE INVENTION

It is an object of this invention to provide a vibration detecting device which is capable of outputting a detection signal representing vibrations from an engine exactly as they are.

To accomplish this object, the device in accordance with this invention has an effective contact surface which has a smaller area than that of the surface of the boss on which the device is mounted.

The device in accordance with this invention shows a flat frequency characteristic in the range from 1 KHZ to 20 KHZ in which it is naturally flat.

BRIEF DESCRIPTION OF THE DRAWINGS

The present invention will be described hereinunder in detail by way of preferred embodiments and with reference to the accompanying drawings, wherein:

FIGS. 1 and 2 are side views showing first and second embodiments of this invention, respectively, FIG. 3 is a graph showing the frequency characteristic of the first and second embodiments of this invention, FIG. 6 is a side view showing the device illustrated in FIG. 5 in the mounted state, and FIG. 7 is a graph showing the frequency characteristic of the device illustrated in FIG. 6.

DETAILED DESCRIPTION OF THE INVENTION

Figure 5:
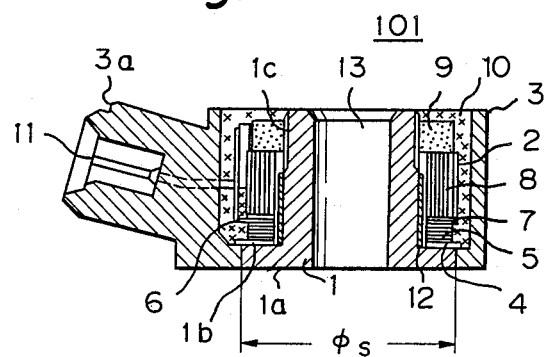

FIG. 1 shows a vibration detecting device 101 in accordance with the invention which has the same arrangement as that shown in FIG. 5. The device 101 has an effective contact surface with a smaller diameter $\phi_s$ than the diameter $\phi_2$ of the mounting or planar contact surface of the boss 21 provided on an internal combustion engine.

FIG. 2 shows an alternative embodiment of this invention wherein a far greater difference ($\phi_3 >> \phi_s$) between the diameter $\phi_s$ and the diameter $\phi_3$ of the mounting surface of the boss 21 is provided.

In both embodiments, the vibration detecting device 101 is mounted on an engine in a such manner that the whole of the effective contact surface is in face contact with the mounting surface of the boss 21, thus attaining a flat frequency characteristic in the range from 1 KHZ to 20 KHZ as viewed in FIG. 3.

Figure 4:
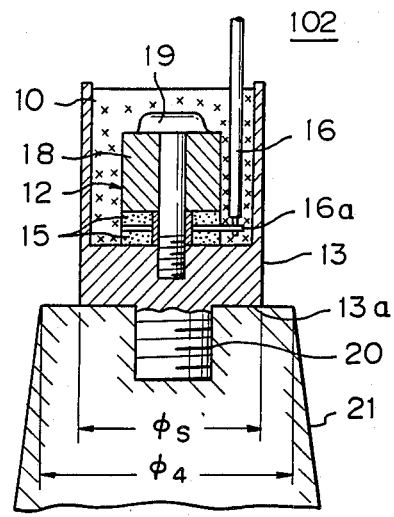
FIG. 4 is a side view showing a third embodiment of this invention, FIG. 5 s a side view showing a vibration detecting device of a conventional type.

The vibration detecting device employed in the above embodiments should not be limited to what is shown in FIG. 5, an alternative device 102 being shown in FIG. 4. The device 102 was disclosed in Japanese Utility Model Publication No. 60-23730. It comprises a housing 13 with a Vibration-Voltage converter 12 which is disposed therein and fixed and in place by means of a bolt 19 and consists of a piezoelectric element 15 and a weight 18. An output signal is led through a terminal 16a and a lead wire 16. The space within the housing 13 is plugged with a filling 10. The housing 13 has a lower surface with an integral bolt 20 which is screwed into the boss of an internal combustion engine to secure the device 102 to the engine in such a manner that the whole of the effective contact surface of the device 102 is in face contact with the mounting surface of the boss.

Since the device 102 is arranged so that the effective contact surface has a diameter $100_5$ which is smaller than the diameter $\phi_4$ of the mounting surface of the boss 21, the same functions and advantages as described hereinbefore are made available.

It should be noted that the described embodiments are not necessarily exclusive; for example, the effective contact surface and the mounting surface of the boss need not necessarily be circular, even though the term "diameter" is employed in describing the above embodiments. It is important that, regardless of its shape, the effective contact surface be small enough that no part of it extends beyond the mounting surface when mounted.

As described, since the effective contact surface is made smaller than the mounting surface of the boss provided on an internal combustion engine, the vibration detecting device shows a flat frequency characteristic which enables it to provide signals representing vibrations from an engine exactly as they are.

What is claimed is:

1. A vibration detecting device comprising a housing for mounting on an internal combustion engine through a boss having a substantially planar contact surface for contacting the device, said housing having a center bore for receiving a bolt therethrough, said bolt being screwed into said boss to thereby secure the device to said boss, said housing including an annular space surrounding said center bore for containing a Vibration-Voltage converter consisting of a piezoelectric element and a weight adapted to impose inertial force on said piezoelectric element, and said housing having an effective contact surface which is smaller in area than said substantially planar contact surface of said boss and the whole of which is in face contact with said substantially planar contact surface of said boss when mounted such that the device exhibits a flat frequency characteristic during detection of vibrations from said engine.

2. The vibration detecting device as recited in claim 1, wherein said substantially planar contact surface of said boss has a diameter $100_2$ which is greater than a diameter $\phi_s$ of said effective contact surface of said device.

* * * * *